Patented Nov. 11, 1952

2,617,776

UNITED STATES PATENT OFFICE 2,617,776

COATING COMPOSITIONS

Paul E. Marling, Dayton, Ohio, assignor to Monsanto Chemical Company, St. Louis, Mo., a corporation of Delaware No Drawing. Application October 25, 1948, Serial No. 56,470

8 Claims. (Cl. 260—22)

This invention relates to improved coating compositions readily prepared from inexpensive and abundantly available raw materials. More particularly the invention relates to self-drying, film-forming compositions involving styrenated alkyd resins and vinyl esters of tall oil.

The paint and varnish industry has been seeking to adapt styrene to coating compositions because of its low cost and general availability. Many useful coating compositions have been prepared but they have not had wide application because of their brittleness and because of the difficulty of avoiding incompatibility with many of the conventional varnish components. This incompatibility tends to reduce the strength of the film, to increase its susceptibility to water and alkali as well as to produce cloudy or opaque films. It is also known that transparent drying oil substitutes can be prepared from styrene by interpolymerizing it with unsaturated alkyd resins by specialized procedures. Compounds of this type are commercially available and are known to the coating industry as "styrenated alkyd resins." Although for some purposes the available styrenated alkyd resins are useful, there are many formulations, particularly blends with natural drying oils, in which the utility is limited by the incompatibility of the components.

The primary purpose of this invention is to provide new transparent coating compositions from styrene and related monomers. A further purpose is to provide coating compositions having unusual resistance to thermo softening and to the action of organic solvents, water and alkali. A still further purpose of the invention is to modify coating compositions from styrenated alkyd resins and to improve their utilities.

The expression "styrenated alkyd," as used in the protective coating industry and in this specification and its appended claims, means a copolymer of an unsaturated alkyd and a styrene type of monomer, such as styrene, α-methylstyrene, vinylbiphenyl, and isopropenylbiphenyl. The unsaturated alkyd resins are polyester condensation products involving the unsaturated drying oil acids, aliphatic polyhydroxy compounds, polycarboxylic acids, and in some cases saturated monocarboxylic acids. Suitable drying oil acids are the acids derived from saponification of linseed oil, soy oil, chinawood oil, dehydrated castor oil, oiticica oil, and similar drying and semi-drying oils, and includes oleic acid, linoleic acid, linolenic acid, eleostearic acid, geranic acid, sorbic acid, palmitolic acid, and humeroceric acid. In the preparation of the alkyd resins useful polyhydroxy aliphatic compounds are any of the glycols, such as ethylene glycol, diethylene glycol, triethylene glycol, higher polyethylene glycol and mixtures thereof, the propylene glycols and polypropylene glycols, the higher glycols, such as tetramethylene glycol, hexamethylene glycol and decamethylene glycol, glycerol, sorbito, mannitol, erythritol and pentaerythritol. Useful carboxylic acids for the alkyd preparation are the phthalic acid, maleic acid, succinic acid, fumaric acid, adipic acid and itaconic acid, and the anhydrides of the cis-dicarboxylic acids. As is conventional in the alkyd preparation art, monocarboxylic acids, such as benzoic acid and salicyclic acid, and monohydric alcohol, such as benzyl and butyl alcohol may be used to terminate the polyester chains.

The styrenated alkyd resins are prepared by first forming the alkyd resin which can be initiated by reacting glycerol with a drying oil in the presence of an alcoholysis catalyst, for example calcium hydroxide or by esterifying glycerine with drying oil acids, the proportions of reactants being such that the monoglyceride is formed in either case, which is then reacted with polybasic acid, and if desired with more glycerol or other polyhydroxy alcohol to produce a final alkyd composition with an acid number between 0 and 20. The initial stage may utilize any of the polyhydroxy alcohols in place of the glycerol, any of the well known polycarboxylic acids as cross-linking agents, and any monocarboxylic acid or alcohol to terminate polyester chains and reduce the average molecular weight of the polyester. The alkyd so formed is a transparent, viscous liquid composition and will have little or no color.

The alkyd resins prepared in accordance with the preceding paragraph are then copolymerized with styrene, or homologue thereof, preferably in the presence of a suitable peroxy catalyst, which is soluble in the mixed monomer, for example benzoyl peroxide, acetyl peroxide, t-butyl hydroperoxide, hydrogen peroxide, or isopropyl percarbonate, or in the polymerization medium. From 0.01 to 5 percent by weight of the peroxide (based on the monomer) may be used.

Several methods are known to be useful in the preparation of the styrenated alkyd resins. If desired the reaction may be conducted in the presence of an inert solvent or diluent, such as xylene, benzene, toluene, dioxane, or petroleum ether at reflux temperature, and adding the styrene type monomer gradually until a reaction mass of pre-determined viscosity is effected. The end-point viscosity being that which will yield a desired viscous liquid copolymer after evaporation of the inert solvent or diluent.

An alternative method of preparing the styrenated alkyd resin, heating a mixture of the alkyd resin and the vinyl or isopropenyl aromatic hydrocarbon and heating them until the monomers are copolymerized to the desired extent as determined by the measured viscosities.

In accordance with this invention the styrenated alkyd resins are blended with vinyl esters of tall oil, which are compounds well known to the art, and are prepared by the vinylation of tall oil acids by means of acetylene in the presence of certain heavy metal salt catalysts, such as mercury, zinc and cadmium salts. These esters are known to be capable of polymerization in the manner similar to other vinyl esters. The tall oil vinyl esters are mixtures of the vinyl esters of aliphatic monocarboxylic acids having from eight to eighteen carbon atoms.

The new coating compositions are blends of the styrenated alkyd resins and vinyl esters of tall oils. The coating films produced from this mixture have desirable properties not possessed by either of the constituent compositions and do not possess some inherent disadvantageous properties of the components. The new compositions are made by blending from 10 to 75 percent of the vinyl esters of tall oil with from 25 to 90 percent of the styrenated alkyd resin. If desired the styrenated alkyd resin may be thinned with a suitable solvent, for example turpentine, petroleum ether, xylene, toluene and benzene prior to mixing with the vinyl esters of tall oil. The blend is finally prepared for use by adjusting its viscosity with the addition of more thinner or resin as may be required by the particular means of application contemplated.

Although the invention is particularly directed to the preparation of transparent films, conventional paint formulations may be used involving pigments, driers and other additives. The coating compositions, especially when driers are incorporated, may be effectively dried at room temperatures. Coating compositions may also be prepared by drying with infra-red lamps, or by baking in a suitable oven at elevated temperatures, for example from 100° F. to 400° F.

Further details of the preparation and practice of this invention are set forth with respect to the following specific examples.

VINYL ESTERS OF TALL OIL

Example 1

Six hundred parts by weight of purified tall oil and 5.4 parts of zinc acetate

$(Zn(O-CO-CH_3)_2 \cdot 2H_2O)$ were heated to a temperature of 194-196° C. While vigorously stirring the mixture, a stream of acetylene was passed through for thirty-six hours at which time the reaction mass was found to have an acid number of fourteen. The product was then cooled and used in the following coating composition formulations.

STYRENATED ALKYDS

Example 2

A glass reaction vessel was charged with 100 parts by weight of dehydrated castor oil (viscosity F-G), 25 parts by weight of 98 percent glycerine and 0.04 part of calcium hydroxide. The mixture was heated at 460° F. for fifteen minutes with agitation and a stream of nitrogen bubbling through it. At this point the product was soluble in methyl alcohol to the extent of about twenty percent. The product was then mixed with 66 parts of phthalic anhydride, 12 parts of 98 percent glycerine and the mixture heated to 460° F. and maintained between 460 and 470° F. for fifteen minutes. At this point the mixture had an acid number of twenty.

The alkyd resin prepared in the manner described in the preceding paragraph was cooled to 300° F. and 79 parts by weight of a clear solution of 126 parts by weight of styrene, 54 parts of α-methyl styrene and 5.4 parts of benzoyl peroxide was gradually added over a period of two hours. After the reactants had been combined the temperature was increased to 480° F. and maintained for one-half hour with refluxing. The resulting product was a clear solution at room temperature. A varnish was prepared by adding mineral spirits to the desired solid content.

COATING COMPOSITIONS

Example 3

Vinyl esters of tall oil were blended in various proportions with a petroleum spirit solution of a styrenated alkyd resin (50 percent solids). Steel panels were coated with the compositions and baked one and one-half hours at 250° F. The following table sets forth the properties of the films produced by each of the compositions.

| Styrenated Alkyd Resins, Parts by Weight of Solids | Vinyl Esters of Tall Oil, Parts by Wt. | Properties of the Film |
|---|---|---|
| 10 | 0 | Hard and Clear. |
| 10 | 2 | Do. |
| 10 | 4 | Do. |
| 10 | 14 | Do. |
| 10 | 24 | Flexible and Clear. |
| 10 | 36 | Very Flexible and Clear. |
| 10 | 46 | Soft. |
| 0 | 100 | Very soft. |

Compositions containing in excess of 75 percent of the vinyl esters were found to be soft, however clear, transparent films were obtained. Styrenated alkyd resin has very poor compatibility for drying oils, alkyd resins and other conventional varnish components, however, blends of the styrenated alkyd resins and vinyl esters of tall oil are quite compatible.

To demonstrate the differences in compatibility, coating compositions were prepared from various proportions of the styrenated alkyd resin and soy bean oil. The following table demonstrates the difference in physical properties observed.

| Styrenated Alkyd Resins, Pts. by Wt. of Solids | Soy Bean Oil, Pts. by Wt. | Properties of Films |
|---|---|---|
| 10 | 2 | Flexible and Opaque. |
| 10 | 5 | Moderately Soft and Opaque. |
| 10 | 7 | Very Soft and Opaque. |

Example 4

To demonstrate the air drying properties of the new films additional experiments were conducted by preparing various mixtures of the vinyl esters of tall oil and the styrenated alkyd resins with cobalt naphthenate drier (0.025 percent cobalt on solids content). Wood panels were coated with the compositions and permitted to dry in contact with air. The following table sets forth the description of the different compositions and the difference in drying properties observed by periodic inspection.

| Styrenated Alkyd Resins, Parts by Weight of Solids | Vinyl Esthers of Tall Oil, Parts by Weight | Time to Dry Dust Free | Remarks |
|---|---|---|---|
| | | Hours | |
| 10 | 0 | 1 | Clear. |
| 10 | 2 | 1 | Do. |
| 10 | 5 | 1 | Do. |
| 10 | 10 | 2 | Do. |
| 0 | 10 | 18 | Do. |

The above data demonstrate that compatible films are produced in all proportions when styrenated alkyd resins are mixed with the vinyl esters of tall oil. A control, using one hundred percent vinyl esters of tall oil was made but the film did not dry satisfactorily in air in a twenty-four hour period.

To demonstrate the improved compatibility the styrenated alkyd resins were blended in soy oil and films were prepared as described above. The following table sets forth a description of the compositions and the observed properties of the films.

| Styrenated Alkyd Resins, Parts by Weight of Solids | Soy Bean Oil, Pts. by Wt. | Time to Dry Dust Free | Remarks |
|---|---|---|---|
| | | Hours | |
| 10 | 0 | 1 | Clear. |
| 10 | 2 | 7 | Opaque. |
| 10 | 5 | 18 | Do. |
| 10 | 10 | 24 | Do. |
| 0 | 10 | 30 | Clear. |

The invention is defined by the following claims.

I claim:

1. A coating composition comprising (A) 25 to 90 percent by weight of a copolymer of an alkyd resin having an acid number from 0 to 20, said alkyd resin being a condensation product of a drying oil fatty acid, an aliphatic polyhydroxy alcohol and a polycarboxylic acid; and a monomer of the group consisting of styrene, vinylbiphenyl, isopropenylbiphenyl and α-methylstyrene, and (B) 10 to 75 percent by weight vinyl esters of tall oil.

2. An article comprising a structure having superposed thereon a coating comprising a film of a blend of (A) 25 to 90 percent by weight of a copolymer of an alkyd resin having an acid number from 0 to 20, said alkyd resin being a condensation product of a drying oil fatty acid, an aliphatic polyhydroxy alcohol, and a polycarboxylic acid; and a monomer of the group consisting of styrene, vinylbiphenyl, isopropenylbiphenyl, and α-methylstyrene, and (B) 10 to 75 percent by weight vinyl esters of tall oil.

3. A coating composition comprising (A) 25 to 90 percent by weight of a copolymer of an alkyd resin having an acid number from 0 to 20, said alkyd resin being a condensation product of a drying oil fatty acid, an aliphatic polyhydroxy alcohol and a polycarboxylic acid; and styrene, and (B) 10 to 75 percent by weight vinyl esters of tall oil.

4. A coating composition comprising (A) 25 to 90 percent by weight of a copolymer of an alkyd resin having an acid number from 0 to 20, said alkyd resin being a condensation product of a drying oil fatty acid, an aliphatic polyhydroxy alcohol and a polycarboxylic acid; and α-methylstyrene, and (B) 10 to 75 percent by weight vinyl esters of tall oil.

5. A coating composition comprising (A) 25 to 90 percent by weight of a copolymer of an alkyd resin having an acid number from 0 to 20, said alkyd resin being a condensation product of a drying oil fatty acid, an aliphatic polyhydroxy alcohol and a polycarboxylic acid; and vinylbiphenyl, and (B) 10 to 75 percent by weight vinyl esters of tall oil.

6. An article comprising a structure having superposed thereon a coating comprising a film of a blend of (A) 25 to 90 percent by weight of a copolymer of an alkyd resin having an acid number from 0 to 20, said alkyd resin being a condensation product of a drying oil fatty acid, an aliphatic polyhydroxy alcohol and a polycarboxylic acid; and styrene, and (B) 10 to 75 percent by weight vinyl esters of tall oil.

7. An article comprising a structure having superposed thereon a coating comprising a film of a blend of (A) 25 to 90 percent by weight of a copolymer of an alkyd resin having an acid number from 0 to 20, said alkyd resin being a condensation product of a drying oil fatty acid, an aliphatic polyhydroxy alcohol and a polycarboxylic acid; and α-methylstyrene, and (B) 10 to 75 percent by weight vinyl esters of tall oil.

8. An article comprising a structure having superposed thereon a coating comprising a film of a blend of (A) 25 to 90 percent by weight of a copolymer of an alkyd resin having an acid number from 0 to 20, said alkyd resin being a condensation product of a drying oil fatty acid, an aliphatic polyhydroxy alcohol and a polycarboxylic acid; and vinylbiphenyl, and (B) 10 to 75 percent by weight vinyl esters of tall oil.

PAUL E. MARLING.

REFERENCES CITED

The following references are of record in the file of this patent:

UNITED STATES PATENTS

| Number | Name | Date |
|---|---|---|
| 2,228,365 | Reppe et al. | Jan. 14, 1941 |
| 2,305,224 | Patterson | Dec. 15, 1942 |
| 2,392,710 | Wakeford et al. | Jan. 8, 1946 |
| 2,495,458 | Kanning et al. | Jan. 24, 1950 |

OTHER REFERENCES

Chem. & Eng. News, July 5, 1948, p. 1966.